Sept. 20, 1960     E. R. POWELL     2,952,869

METHOD AND APPARATUS FOR PRODUCING FIBERS

Original Filed July 30, 1952     2 Sheets-Sheet 1

INVENTOR.
EDWARD R. POWELL

BY *Virgil C. Kline*

ATTORNEY

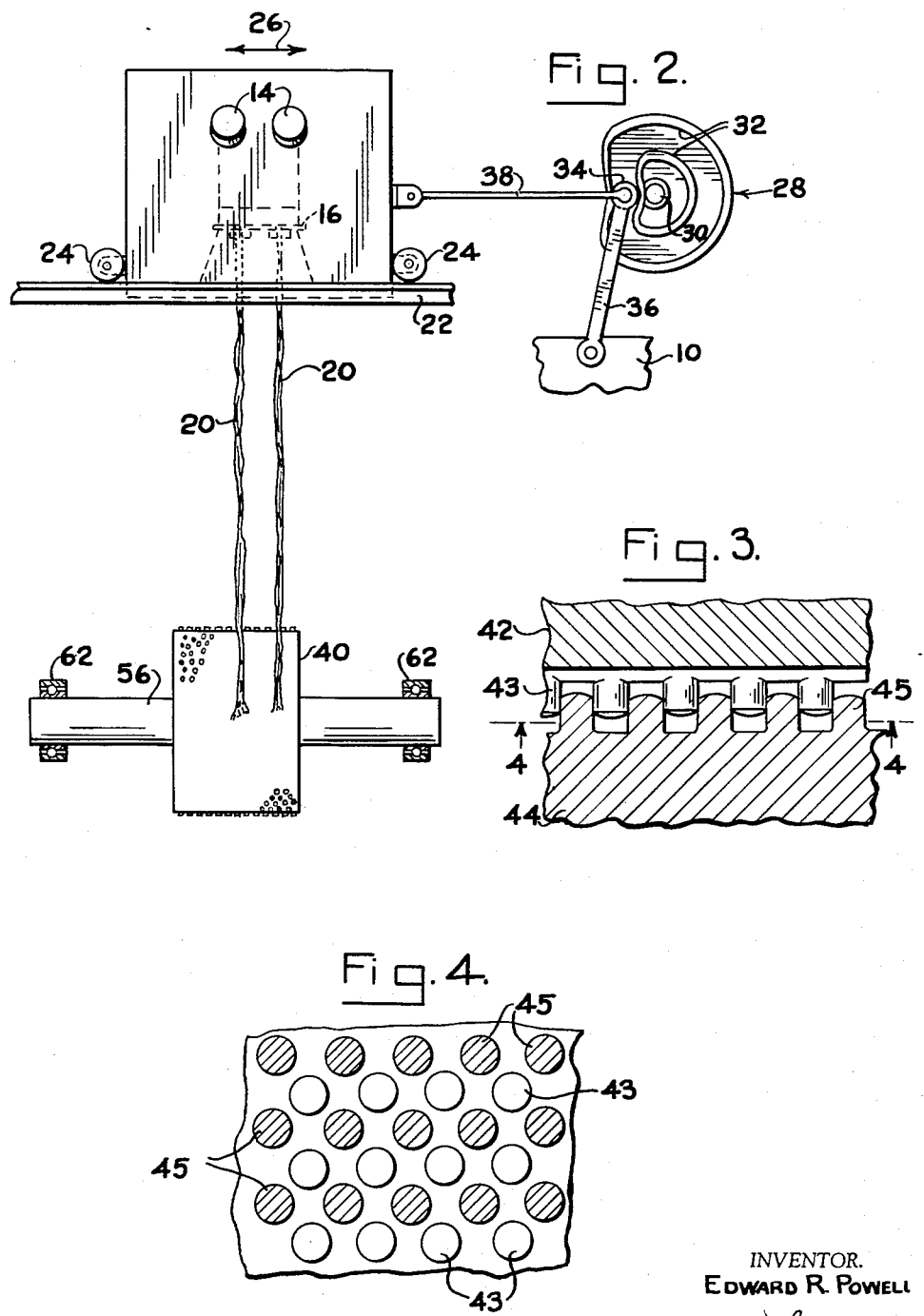

United States Patent Office 2,952,869
Patented Sept. 20, 1960

2,952,869
METHOD AND APPARATUS FOR PRODUCING FIBERS

Edward R. Powell, North Plainfield, N.J., assignor to Johns-Manville Corporation, New York, N.Y., a corporation of New York Continuation of application Ser. No. 301,623, July 30, 1952. This application Dec. 24, 1958, Ser. No. 784,839

19 Claims. (Cl. 18—2.5)

This invention relates to a method and apparatus for the production of long, fine glass fibers and is an improvement of the method and apparatus of my co-pending application, Serial No. 118,815, filed September 30, 1949, now Patent No. 2,605,500, of which application, Serial No. 301,623, filed July 30, 1952 formed a continuation-in-part. The instant application is a continuation of said application Serial No. 301,623 now forfeited. The term "glass" as used herein refers to any composition which has a plastic range rendering it capable of being drawn into fibers or filaments, and while the invention will be particularly described with reference to compositions having working properties similar to those of plate glass, it will be understood that the general principles disclosed herein are applicable to any material falling within the above-recited generic definition of "glass."

A primary problem in the glass fiber industry is to produce, within a given period of time, commercially acceptable fine fiber in such quantity as to make the production economical. A mass of commercial grade fine glass fiber contains individual fibers, the majority of which are from 2 to 10 microns in diameter. One pound of glass will yield, roughly from 6 to 150 million feet of fibers of the above dimensions, and since economical operation requires the production of many pounds of fiber per hour, it is apparent that an entirely satisfactory method and apparatus must initiate the formation of many millions of fibers per minute and attenuate them to a foot or more in length, or perform an equivalent operation with other lengths.

In my said co-pending application I disclose a method and apparatus for economically producing fine glass fiber, the apparatus including a rotating, smooth surface on which a layer of molten glass is formed, and a second rotating member having projections positioned to contact and then move away from the layer to draw fibers therefrom. The drawn fibers are then attenuated to the desired length. Regardless of the width of the rotating surfaces, this specific arrangement can produce fibers of the desired dimensions in satisfactory quantities, but unless these surfaces are made rather narrow, a machine of a given size will not initiate the formation of as great a quantity of fiber as might be expected. For example, a three inch surface width will produce a given number of pounds of fiber per inch per hour, but a six inch surface width has been found not to produce twice that yield. This condition is believed to result from the fact that with the small projection size necessary to permit using a great number of projections per square inch, a critically small contact range is established at the bight between the projections and the surface carrying the layer of molten material, and since a wide surface subjected to extreme heat does not always expand uniformly enough to remain within this critical range, at some regions on the wide surfaces the projections may not contact the layer of molten material and hence will not draw fibers at these spots. As a result of this mechanical limitation in the apparatus of my co-pending application, a greater number of machines is required to produce the same quantity of fiber per minute as would be produced by similar machines without this limitation. The method and apparatus of the present invention not only eliminate this mechanical limitation but also provide for exceeding the maximum production per inch width previously obtainable and result in the production of longer fibers.

A primary object of the present invention is to provide a method and apparatus whereby a greater number of pounds of molten glass can be converted into long, fine fibers within a given period of time by an apparatus of a particular size.

A further object of the present invention is to provide a method and apparatus wherein an increased and substantially uniform number of fibers are initiated in each inch of width of a fiber forming surface.

A further object of the present invention is to provide a pair of adjacent rotating surfaces each having projections thereon, the projections of one surface intermeshing with the projections of the other surface whereby all projections are adapted to contact and condition molten material fed to the surfaces.

A further object of the present invention is to provide an improved method and apparatus for feeding molten material to fiberizing surfaces in such a manner as to enhance the fiberizing action of the surfaces.

My invention will be more fully understood and further objects and advantages thereof will become apparent when reference is made to the more detailed description thereof which is to follow and to the accompanying drawings in which:

Fig. 2 is a front view as seen from the left in Fig. 1, illustrating the details and relation of the furnace and one roll of the invention;

Fig. 3 is an enlarged sectional view taken on line 3—3 of Fig. 1; and,

Fig. 4 is a partially developed sectional view taken on line 4—4 of Fig. 3.

Figure 1:
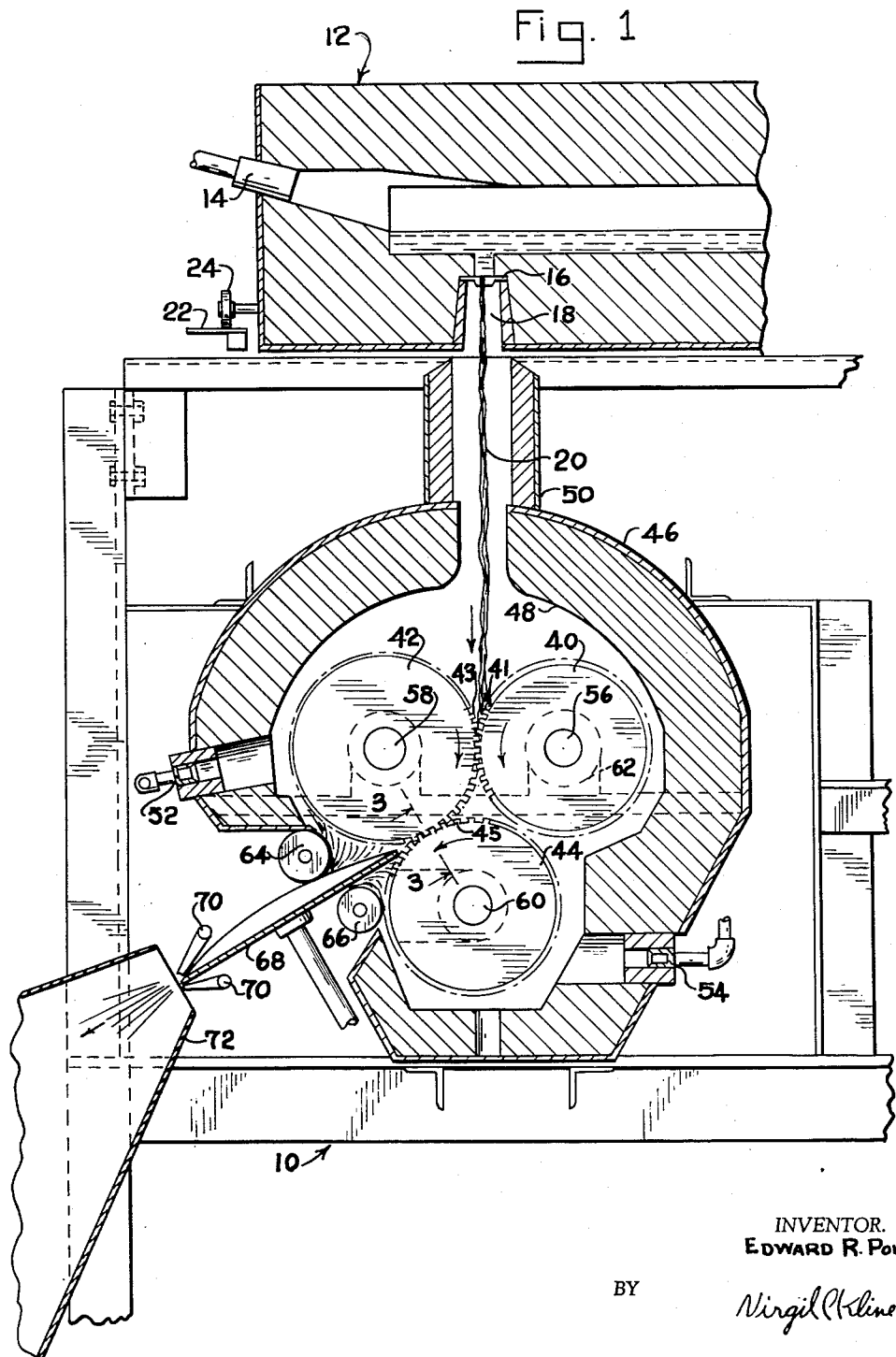
Fig. 1 is a side view, partially in section and partially in elevation, illustrating an apparatus embodying the instant invention.

The general process to which the present invention relates includes the broad steps of melting and feeding fiber forming material to fiberizing elements, drawing the molten material into fibers, and additionally drawing and elongating the fibers. In the drawings there is illustrated an apparatus particularly adapted for, but not limited to, carrying out this general process with plate glass, the various elements of the apparatus being supported on a framework 10 arranged in any convenient manner.

For the purpose of melting and feeding the glass there is provided a furnace 12, of conventional construction, having one or more burners 14 positioned in a side wall thereof, and an orifice plate 16 located in a recess 18 in its bottom wall. The plate 16 is provided with one or more orifices through each of which will flow a stream 20 of molten glass. The furnace 12 is supported for movement on any convenient track means 22 by pairs of rollers 24 suitably connected to the furnace walls. In order to impart a reciprocatory motion to the furnace in the directions indicated by the arrow 26 (Fig. 2), there is provided a uniform-motion cam 28 supported (in a manner not shown) on the framework 10 for rotation about its axis 30. Riding within the space defined by the cam flanges 32 is a cam follower 34 which is supported on a portion of the framework 10 by a pivoted lever 36 and is connected to the furnace in any suitable manner by a connecting rod 38. It will become apparent from the description which follows that any furnace arrangement providing for relatively uniform feeding and distribution of molten material can be employed in the place of furnace 12 and its associated mechanisms. Moreover, other melting equipment might obviously be preferable with fiber forming materials other than plate glass.

Positioned to receive the molten streams 20, fed primarily by gravity from orifice plate 16, are three fiberizing rolls 40, 42 and 44 enclosed by a housing 46 lined with an insulating refractory material 48. An upper extension 50 of the housing 46 extends to a position just beneath the recess 18 in the bottom wall of furnace 12 to provide a shield for maintaining the material of streams 20 in a molten state. Burners 52 and 54 are mounted in opposite walls of housing 46 and these burners may be of any known type designed to maintain the molten material and elements within the housing at the optimum temperatures for distribution and fiberization. The only essential feature of burners 52 and 54, when used in a housing of the contour shown, is that they must provide for substantially uniform lateral heating. With the arrangement shown in the drawings, it is apparent that the construction and relative positions of the burners, rolls, and casing are such that gaseous streams must, by reason of roll rotation, be eventually directed against streams 20 from opposite sides thereof and resist any tendency of the streams to wobble. Rolls 40, 42 and 44 consist of cylindrical shells or tubes of alloy steel and are mounted by suitable spokes (not shown) on hollow shafts 56, 58 and 60, the space between the shafts and the rolls being filled with an insulating material to prevent excessive heating of the shafts. Shafts 56, 58 and 60 are journaled in bearings 62 (Fig. 2) mounted on frame 10, the bearings for shaft 58 being fixed and the bearings of shafts 56 and 60 being mounted for controlled movement toward or away from the bearings of shaft 58 by any conventional means. It will be noted that shafts 56 and 58 lie in approximately the same horizontal plane, and thus rolls 40 and 42 are so disposed that even with considerable wobbling of streams 20 all of the material thereof will be intercepted by the rolls. By any convenient means the rolls 40, 42 and 44 are driven at the same peripheral speed, for example, 700 feet per minute, and the rolls may be of any desired size although an 8 inch diameter for rolls 40 and 44 and a 9 inch diameter for roll 42 has been satisfactorily employed.

In actual operation roll 40 is arranged to intercept streams 20 at a position where a tangent to the roll makes an angle of 30 degrees or less with the streams. The distance between orifice plate 16 and the regions of contact of streams 20 with roll 40 is arranged to be such that the velocity of the streams will be substantially the same at the points of contact as the linear velocity of the roll. The proper distance will vary with the type and viscosity of material used and the size of the streams, but this distance can easily be determined, under any conditions, by moving the orifice plate up or down until no spattering or jerking of the streams occurs when they are intercepted by the roll.

Referring to Figures 3 and 4, the peripheral surface of each roll 40, 42 and 44 is provided with a multiplicity of projections 41, 43 and 45, respectively, preferably ranging in number from 250 to 1000 per square inch, and being spaced at regular intervals somewhat greater in a diagonal direction than the projection diameters. In actual operation rolls 42 and 44 are so positioned in relation to each other that the projections 43 and 45 thereof intermesh, at least to some extent, as will be seen particularly in Fig. 3. The term "intermesh" as used herein means that at the bight between rolls 42 and 44, for example, projections 43 and 45 extend through a plane located midway between the rolls. The term does not refer to the projection grouping which may consist of any desired arrangement although the grouping shown in Fig. 4 is preferred. The projections of rolls 40 and 42 intermesh in the same manner as the projections of rolls 42 and 44.

Rolls 40, 42 and 44 may be of any desired width, but when a furnace arrangement of the type shown is used and it is assumed that the throw of cam 28 is sufficient to move the furnace a distance of 2¾ inches, the rolls are preferably made of a width which is a multiple of three inches, for example, 6, 12 or 18 inches. With a roll width of 6 inches it would be necessary, under the above assumption, to have two orifices in plate 16, thus providing two streams of molten material which would each traverse slightly less than one-half the width of roll 40 once for every half revolution of cam 28. Such an arrangement is illustrated in Fig. 2, and it will be noted that each stream oscillates over a path, the ends of which are located a fraction of an inch from the roll edge and midpoint.

Located at the open side of housing 46 are a pair of rotating cylinders 64 and 66 and a pair of picker wheels 68 (only one such wheel being shown) which cylinders and wheels are substantially the same in construction as those illustrated in my Patent No. 2,605,499. These cylinders and wheels are so positioned that they can intercept and apply additional drawing and attenuating forces to fibers drawn between rolls 42 and 44. At opposite sides of wheels 68 there is provided a pair of jets 70 for the purpose of discharging the fibers into a collecting chamber 72.

In operation, glass, or other plastic furnish, is supplied to the furnace 12 or other melting means and is heated therein to an optimum fluidity for distributing purposes, which for plate glass is attained at approximately 2400–2500° F. Orifice plate 16 is maintained at a temperature, preferably of roughly 1900–2000° F., the flow of glass through the orifices being sufficient with this arrangement to maintain the glass at a temperature preferably 200–300° F. higher than that of the orifice plate. Regardless of the material used, the temperature and size of the orifices and the temperature of the material should be such that the flow through the orifices is continuous as distinguished from dropwise or lumpwise. Cam 28, and hence furnace 12, is driven at a speed proportional to the speed of rolls 40, 42 and 44, and the proportion, depending upon the size of the streams, is preferably such that with a roll speed of 700 feet per minute the streams 20 traverse roll 40 ten to twenty times per minute. The same effect can be attained with a stationary furnace having a greater number of smaller orifices, the only essential characteristic of the operation of this element of the device being that molten material must be fed to roll 40 continuously and fairly uniformly in amounts permitting even distribution to roll 42.

The contour of casing 46 and the position of burners 52 and 54 is arranged to be such that roll 40 will be maintained at a temperature about 20–40° F. lower than the temperature of roll 42, and the temperature of roll 44 will be about 10–70° F. higher than the temperature of roll 42. With plate glass the temperature of roll 42 should be approximately 1900–1990° F., and with other materials this temperature should be that necessary to maintain the material at about the optimum fluidity for fiberization.

The material fed to roll 40 is gradually transferred to roll 42 and a portion of the material on roll 42 is transferred to roll 44. The above differential in rotor temperatures is preferred because of the fact that molten material will ordinarily adhere more strongly to a cold surface than to a hot surface, and by arranging roll 40 to be at a lower temperature than roll 42 which is in turn at a lower temperature than roll 44, there is less likelihood of a lump-like formation on roll 40 being transferred substantially in toto to roll 42 and thence to roll 44 to be thrown into the final product as shot. Where uniformity of the molten material on the surface of roll 40 and a uniform rate of transfer is otherwise assured, the above temperature differential would be unnecessary.

After a short period of operation, the surfaces of rolls 42 and 44 will be coated with fiber forming material, i.e., the surfaces of the projections and the surface areas between the projections will be coated. Thus, the layers of material on the surfaces of these rolls will have a multiplicity of minute protrusions or may be described as layers having multiple-projection contours. When the surfaces of rolls 40 and 42 separate beneath the bight therebetween, there is a tendency for a brush-like formation of fibers to be formed. Since the temperature in this region is sufficiently high to maintain the fiber forming material at a temperature above the fiberizing range, the material of any fibers which tend to be formed will not be viscous enough to result in permanent fibers. As the surfaces of rolls 42 and 44 separate, a brush-like formation of fibers is formed and because of the fact that the temperature in this region is within the fiberizing range, i.e., sufficiently low to increase the viscosity of the material of the formation to such a point that the material can be attenuated into and retain the shape of fibers, permanent fibers are formed. The mid-portions of these fibers are grasped by projections or teeth on picker wheels 68, and the force derived from the rotation of the picker wheels elongates the fibers. It will be noted that during the action of the picker wheels the ends of the fibers are attached to the layers of molten material on the surfaces of rolls 42 and 44. The action of the picker wheels not only elongates the fibers but also carries their end portions into contact with rotating cylinders 64 and 66 which move the fibers lengthwise and cause the drawing of additional material from the layers on rolls 42 and 44 to substantially increase the length of the fibers. Upon continued rotation of rolls 42 and 44 the ends of the fibers are carried back into the relatively hot atmosphere within the casing and at this point the fibers are melted adjacent their ends and detached from the layer of molten material. Blasts from jets 70 remove the fibers from picker wheels 68 and impel them into collecting chamber 72.

Because the projections on the surfaces of the rolls are arranged to intermesh, the clearance range at the bight between rolls 42 and 44 is considerably increased and regardless of irregularities in the surfaces, the molten material on the tops of the projections 43 of roll 42 will always contact and be bonded to the layer of molten material on roll 44 at points located between projections 45, and the molten material on the tops of projections 45 will contact and be bonded to the corresponding regions of the layer on roll 42 in the same manner. Consequently, at each projection 43 and 45 a fiber will be drawn between the top of the projection and the layer of material between the projections on the opposing roll as the roll surfaces separate. However, a greater quantity of fiber is produced by the apparatus of this invention than would be accounted for by the operation just described.

The exact reason for the fiber yield in addition to that which might be expected from the apparatus of this invention is not definitely known although it is believed to result from either or both of the conditions now to be described. It is apparent that because the construction of the surfaces of roll 42 and 44 provides layers of multiple-projection contour, a greater surface area of fiber forming material is provided than would be the case if only one or neither of the rolls were provided with projections. Since the projections intermesh it is possible that fibers are drawn between material on the sides of projections as well as between material on the top of a projection and in the space between projections, i.e., the layer of molten material on the side of a projection 43 may move into substantially point contact with and be bonded to the layer of material on the side of a projection 45, and when the projections separate a fiber may be drawn at this point. Thus, it is possible that the additional fiber yield results only from the fact that the greater area of fiber forming surface and the contours of the layer surfaces provide an opportunity for contact and bonding between the layers at an increased number of points.

The additional fiber yield may also result from the fact that wherever fiber ends are melted, as described above, minute lumps or points corresponding to incipient fibers remain in the layers of fiber forming material. Since from the very nature of their formation such points would at least to some extent be located on the sides of the projections and would protrude from the layers of fiber forming material, it is apparent that these points might be contacted by the layer on the opposing roll and the additional fibers drawn therefrom. Regardless of the reasons therefor, it can definitely be stated that bonding the two layers of multiple-projection contour and then separating them produces a greater quantity of fiber per inch width than was previously obtainable.

It will be noted that the projections on roll 40 perform an important function in that they not only provide for even distribution of molten material on and between the projections of roll 42, but also probably form thereon points corresponding to incipient fibers. This improved conditioning of the layers of fiber forming material is believed to account for the production of longer fibers by the apparatus of this invention.

Having thus described my invention in rather full detail, it will be understood that these details need not be strictly adhered to and that various changes and modifications may suggest themselves to one skilled in the art, all falling within the scope of the invention as defined by the subjoined claims.

What I claim is:

1. A method of producing fibers comprising forming a mass of molten fiber-forming material into two layers each having a multiplicity of rows of projecting portions, intermeshing the projecting portions of one layer with the projecting portions of the other layer to bond the layers to each other, and moving the bonded layers relatively away from each other to draw fibers therebetween.

2. A method of producing fibers comprising forming a mass of molten fiber-forming material into two layers each having a multiplicity of rows of substantially uniformly spaced projecting portions, intermeshing the projecting portions of one layer with the projecting portions of the other layer to bond the layers to each other, and moving the bonded layers relatively away from each other to draw fibers therebetween.

3. A method of producing fibers compirsing forming a mass of molten fiber-forming material into two layers each having 250 to 1000 projecting portions in each square inch of layer surface area, intermeshing the projecting portions of one layer with the projecting portions of the other layer to bond the layers to each other, and moving the bonded layers relatively away from each other to draw fibers therebetween.

4. A method of producing fibers comprising forming a mass of molten fiber-forming material into a first layer having a multiplicity of rows of projecting portions, forming a portion of the molten material of said first layer into a second layer having a multiplicity of rows of projecting portions, intermeshing the projecting portions of said layers to bond said layers to each other, and moving the bonded layers relatively away from each other to draw fibers therebetween.

5. A method of producing fibers comprising discharging molten fiber-forming material from a source of such material, collecting the material so discharged to form a mass of said material, moving a surface into engagement with said mass of material to transfer material to said surface, forming said transferred material into two layers, and drawing fibers from the material of said layers.

6. A method of producing fibers comprising discharging molten fiber-forming material from a source of such material, collecting the material so discharged on a first surface to form a mass of said material, moving a second surface into engagement with said mass of material on said first surface, transferring a portion of said mass to said second surface to form a first layer thereon, contacting said first layer with a third surface, transferring a portion of said first layer to said third surface to form a second layer thereon, and drawing fibers between said layers.

7. A method of producing fibers comprising discharging a stream of molten fiber-forming material, intercepting said stream with a surface moving in the same general direction as said stream at a velocity substantially the same as the velocity of said stream at the region of interception, and forming fibers from said molten material.

8. A method of producing fibers comprising collecting a mass of molten fiber-forming material on a relatively cool surface, contacting said mass with a relatively hot surface, moving said hot surface relatively away from said cool surface to transfer a portion of said mass to said hot surface, and forming fibers from the portion so transferred.

9. A method of producing fibers comprising discharging molten fiber-forming material from a source of such material, collecting the material so discharged on the periphery of a first rotor to form a mass of said material, rotating said first rotor, moving the peripheral surface of the second rotor into engagement with said mass of material on the first rotor, transferring material from said first rotor to said second rotor by rotating said second rotor in a direction opposite to the direction of rotation of said first rotor whereby corresponding portions of said peripheries move relatively toward and then relatively away from each other, maintaining the region where said peripheries begin to move relatively away from each other at a temperature above the fiberizing range of said fiber-forming material, contacting the material on said second rotor with the periphery of a third rotor, and drawing fibers between said second and third rotors.

10. A method of producing fibers comprising discharging a stream of molten fiber-forming material, directing fluid streams against opposite sides of said stream of material to steady the stream, intercepting said stream with a relatively cold surface moving is the same general direction as said stream at a velocity substantially the same as the velocity of said stream at the region of interception, collecting a mass of said material on said relatively cold surface, contacting said mass with a relatively hot surface to transfer a portion of said mass to said relatively hot surface, forming the portion of said mass so transferred into a first layer of said material having a multiplicity of projecting portions, forming a portion of the molten material of said first layer into a second layer having a multiplicity of projecting portions, intermeshing the projecting portions of said layers to bond said layers to each other, and moving the bonded layers relatively away from each other to draw fibers therebetween.

11. An apparatus for producing fibers comprising, a pair of surfaces each having a multiplicity of rows of projections thereon, means for moving projections of one surface into and out of intermeshing relationship with projections of the other surface, and means for supplying molten fiber-forming material to said surfaces.

12. An apparatus as defined in claim 11 and including means for maintaining one of said surfaces at a higher temperature than the temperature of the other surface.

13. An apparatus for producing fibers comprising a pair of rolls each having a multiplicity of rows of projections on a surface thereof, means mounting said rolls for rotation with projections of one roll intermeshing with projections of the other roll, and means for supplying molten fiber-forming material to said surfaces.

14. An apparatus for producing fibers comprising a pair of rolls each having a multiplicity of rows of projections on the peripheral surface thereof, means mounting said rolls for rotation in opposite directions with projections of one roll intermeshing with projections of the other roll, whereby corresponding portions of said surfaces move relatively toward and away from each other, and means for supplying molten fiber-forming material to said surfaces.

15. An apparatus as defined in claim 14 and including means for maintaining the region where said surfaces begin to move relatively away from each other at a temperature above the fiberizing range of said fiber-forming material.

16. An apparatus as defined in claim 14 and including means for maintaining the region where said surfaces begin to move relatively away from each other at a temperature within the fiberizing range of said fiber-forming material.

17. An apparatus for producing fibers comprising a pair of rolls each having a multiplicity of rows of projections on the peripheral surface thereof, means mounting said rolls for rotation with projections of one roll intermeshing with projections of the other roll, and means for directing molten fiber-forming material toward said surfaces.

18. An apparatus for producing fibers comprising first, second and third rolls each having a multiplicity of rows of projections on the peripheral surface thereof, means mounting said rolls for rotation with projections of said first roll intermeshing with projections of said second roll and projections of said second roll intermeshing with projections of said third roll, and means for supplying molten fiber-forming material to said first roll.

19. A method of producing fibers comprising feeding material onto the peripheral surface of a first rotor, maintaining the peripheral surface of said first rotor at a temperature so that said material thereon is at a proper viscosity for distribution, contacting the material on the peripheral surface of said first rotor with the peripheral surface of a second rotor to transfer part of said material to the peripheral surface of said second rotor so that the material on the peripheral surface of said second rotor has a plurality of projecting points, contacting a plurality of said projecting points with the peripheral surface of a third rotor whereby said projecting points are bonded to the peripheral surfaces of both the second and third rotors, and drawing fiber between said second and third rotors.

No references cited.